US007127102B2

United States Patent
Hiramatsu et al.

(10) Patent No.: US 7,127,102 B2
(45) Date of Patent: Oct. 24, 2006

(54) COLOR MATCHING METHOD AND DEVICE, COLOR MATCHING PROGRAM, AND COMPUTER READABLE RECORD MEDIUM THAT STORES COLOR MATCHING PROGRAM ALLOWING APPROPRIATE COLOR MATCHING AT HIGH SPEED

(75) Inventors: Naoko Hiramatsu, Kyoto (JP); Fumiko Uchino, Kyoto (JP); Kenji Masaki, Nagaokakyo (JP); Satoshi Deishi, Ibaraki (JP); Toshitsugu Yamamoto, Takatsuki (JP); Masahiro Hayakawa, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 716 days.

(21) Appl. No.: 09/918,530

(22) Filed: Aug. 1, 2001

(65) Prior Publication Data

US 2002/0031256 A1 Mar. 14, 2002

(30) Foreign Application Priority Data

Aug. 2, 2000 (JP) ............................. 2000-234500

(51) Int. Cl.
*G06K 9/00* (2006.01)
(52) U.S. Cl. .................................................... 382/162
(58) Field of Classification Search ................ 382/162, 382/166, 167, 274; 358/1.9, 500–504, 509, 358/518–520; 345/589–604; 348/645–663; 430/328
See application file for complete search history.

(56) References Cited

U.S. PATENT DOCUMENTS

| 4,439,517 A | * | 3/1984 | Irving .......................... 430/328 |
| 5,937,089 A | * | 8/1999 | Kobayashi ................... 382/167 |
| 6,023,527 A | * | 2/2000 | Narahara ...................... 382/167 |
| 6,125,199 A | * | 9/2000 | Sato et al. ................... 382/162 |
| 6,388,674 B1 | * | 5/2002 | Ito et al. ....................... 345/590 |
| 6,560,358 B1 | * | 5/2003 | Tsukada ....................... 382/167 |
| 6,654,491 B1 | * | 11/2003 | Hidaka ......................... 382/162 |
| 2003/0020934 A1 | * | 1/2003 | Nishida ....................... 358/1.9 |

FOREIGN PATENT DOCUMENTS

| EP | 0 974 934 A2 | * | 1/2000 |
| JP | 08-256275 | | 10/1996 |
| JP | 2000-050088 | | 2/2000 |
| JP | 2000-134494 | | 5/2000 |

* cited by examiner

*Primary Examiner*—Ishrat Sherali
(74) *Attorney, Agent, or Firm*—Buchanan Ingersoll & Rooney PC

(57) ABSTRACT

From profiles of an input color space and an output color space, the specific color data on respective color spaces are obtained, and a color space compression parameter is set based on each specific color data obtained. In other words, the color space compression parameter for appropriately converting data within the input color space into data within the output color space is derived from each specific color data. The color space compression processing (color matching) is performed on an absolute color space using the derived color space compression parameter so that it becomes possible to perform at a higher speed an appropriate color matching that takes into account the characteristics of the input color space and the output color space.

14 Claims, 13 Drawing Sheets

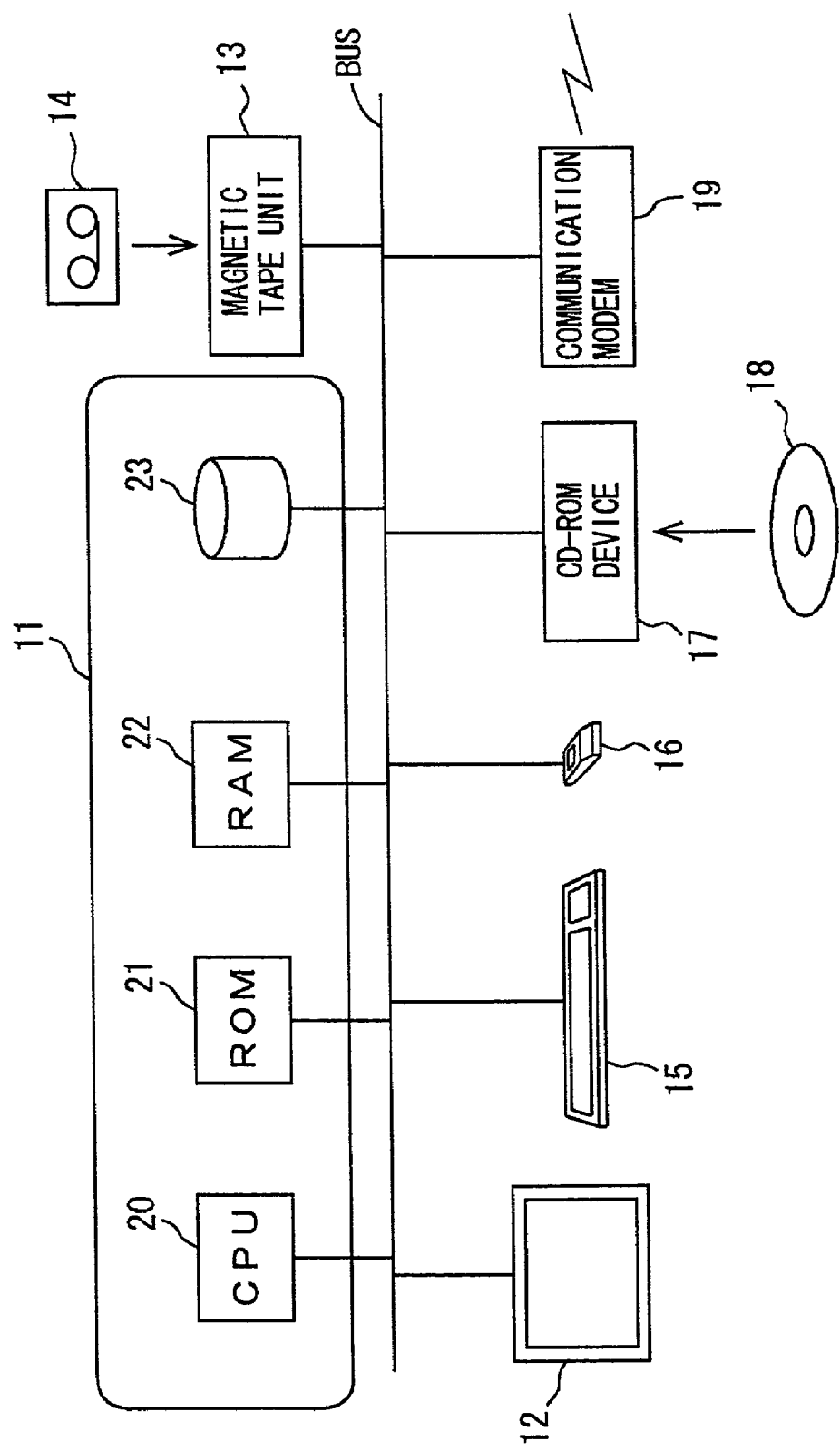
F I G. 2

COLOR TEMPERATURE OF INPUT COLOR SPACE : 5000K

COLOR TEMPERATURE OF INPUT COLOR SPACE : 9300K

CHROMA DIFFERENCE TO 50%

FIG. 10
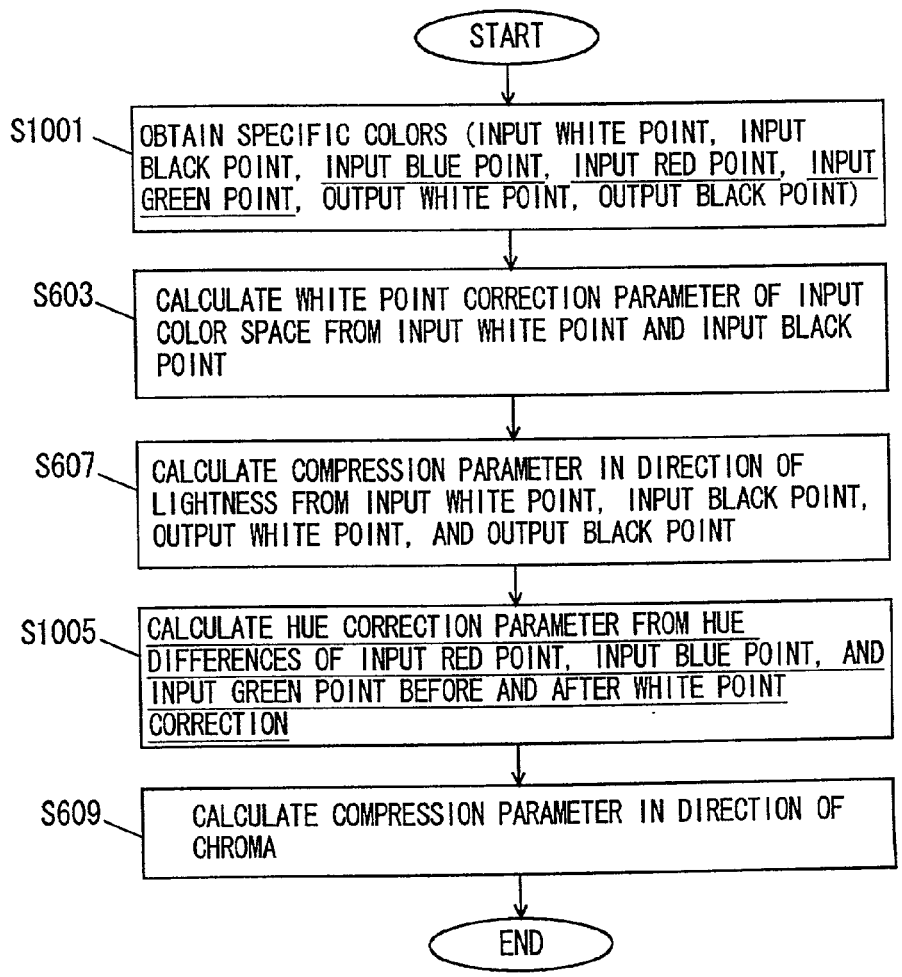
FIG. 11A    FIG. 11B
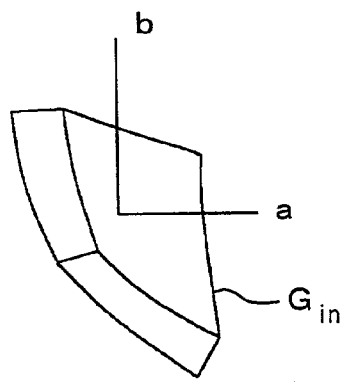
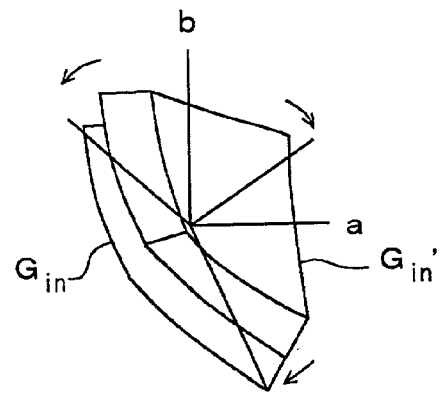

F I G. 1 3
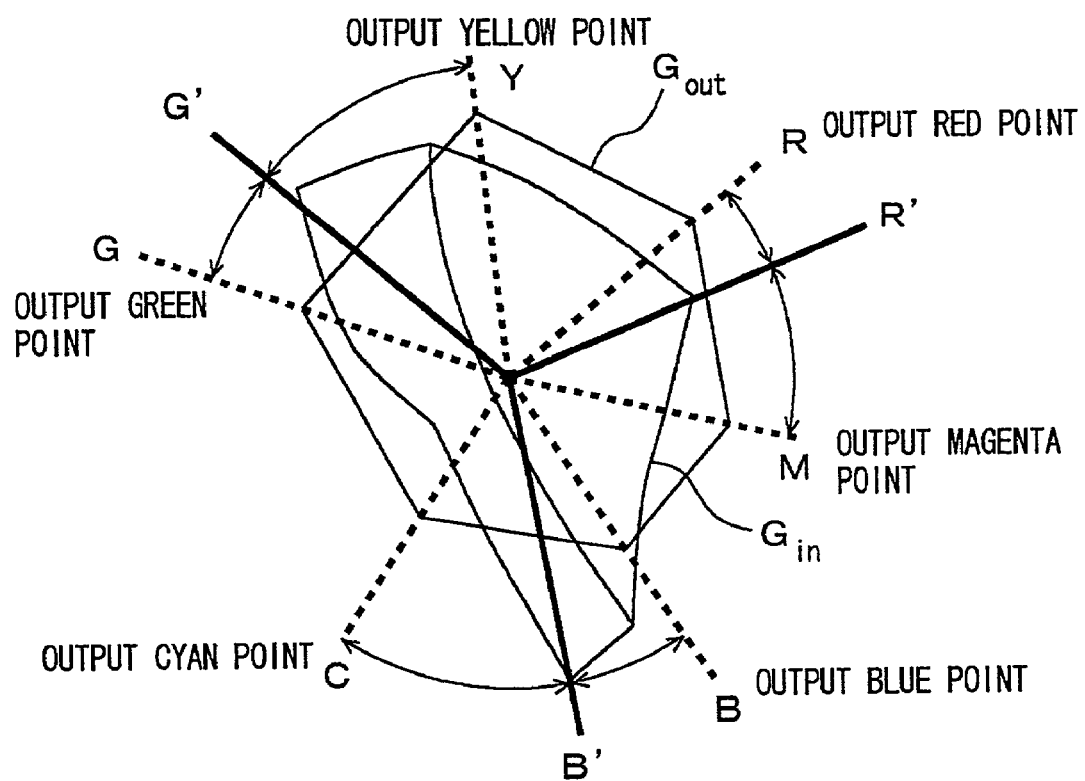

COLOR MATCHING METHOD AND DEVICE, COLOR MATCHING PROGRAM, AND COMPUTER READABLE RECORD MEDIUM THAT STORES COLOR MATCHING PROGRAM ALLOWING APPROPRIATE COLOR MATCHING AT HIGH SPEED

This application is based on application No. 2000-234500 filed in Japan, the content of which is hereby incorporated by reference.

BACKGROUND OF THE INVENTION

1. Field of the Invention

The present invention relates to a color matching method, a color matching device, a color matching program, and a computer readable record medium that stores the color matching program, and more specifically, to a color matching method, a color matching device, a color matching program, and a computer readable record medium that stores the color matching program, which are used for converting digital image data reproducible by a device such as a CRT (cathode ray tube) into image data reproducible by an output device such as a printer.

2. Description of the Background Art

In general, the color reproducible range of a CRT or a scanner is different from the color reproducible range of a printer. Thus, where the color reproduction ranges (Gamut) of two devices differ, matching of colors, i.e. color matching, is required between the two devices when an image reproduced by one device is to be reproduced by the other device. A general color matching method of the conventional art will be described briefly below.

In FIG. 14, the flow of image data is shown for the description of a color matching method between an input device 1401 and an output device 1407. Here, the image data reproduced by input device 1401 such as a CRT or a scanner is RGB data represented in the RGB color space, whereas the image data reproduced by output device 1407 such as a printer is CMYK data represented in the CMY color space. As shown in FIG. 14, the RGB data is ultimately converted into the CMYK data via various conversion processes in a color conversion processing portion 1403.

First, the RGB data in input device 1401 is input to color conversion processing portion 1403 and is converted into data of a color space independent of the device. The color space independent of the device is, for instance, the L*a*b* space, the XYZ space, and the like. Here, it is assumed that the conversion is made into data (L*a*b* data) represented in the L*a*b* space. A conversion using an LUT (Look Up Table) or a masking technique is employed for the conversion processing.

Then, the converted L*a*b* data is further converted in a Gamut mapping portion 1405 into the L*a*b* data of a range reproducible by output device 1407. Thus, it is in this Gamut mapping portion 1405 that the color matching between input device 1401 and output device 1407 is performed.

The data after color matching is also data of a color space independent of the device (L*a*b* data) so that it is again converted into CMYK data. Here also, a conversion using an LUT or a masking technique is employed for the conversion processing.

In this manner, the image data reproduced by input device 1401 is first converted into data of a color space independent of the device, and then, color matching is performed so as to allow the data to be reproduced by output device 1407.

FIG. 15 is a flow chart representing the flow of a conventional color conversion processing in color conversion processing portion 1403 shown in FIG. 14. As shown in FIG. 15, first, the profile of the color space reproducible by input device 1401 (hereinafter referred to as an "input color space") and the profile of the color space reproducible by output device 1407 hereinafter referred to as an "output color space") are respectively obtained (step S1501).

Then, a pixel value (image data) of an input image to be the target of data conversion is obtained ("yes" at step S1503). Then, the image data dependent on the color space of input device 1401 is converted into image data represented in the absolute color space (step S1505). Specifically, the input image data represented in the RGB space is converted into image data represented in the L*a*b* space, the XYZ space, or the like which is the absolute color space independent of a device.

Thereafter, color space compression processing (color matching processing) is performed on the converted absolute color space (step S1507). In other words, here, various conversion processes are performed for converting the image data in the input color space into the image data within the output color space. Specifically, the processes include correction of white point, conversion of lightness (compression/expansion in the direction of lightness), conversion of chroma (compression/expansion in the direction of chroma), correction of hue, and the like. A conversion parameter used in each conversion (or correction) processing is a fixed value derived empirically.

When the various conversion processes in the absolute color space are completed, the image data represented in the absolute color space, in turn, is converted into image data dependent on the color space of output device 1407 (step S1509), and output image data after conversion is obtained in a desired format (step S1511).

Above is a general outline of a common and conventional color matching processing. In this manner, a conversion parameter for performing the color conversion is fixed in advance in the conventional color matching method.

In addition to the above, for instance, a method is proposed in which color conversion tables are created in advance according to the degree of color space compression and the color conversion tables are switched appropriately. Even this method, however, has a fixed conversion parameter for performing the color space compression and the like, and does not change the conversion parameter for performing the color conversion according to the characteristics of the input color space and the output color space.

On the other hand, a color matching method in which a conversion parameter in the color conversion is changed has been conventionally proposed. For instance, such method involves calculating, for each color within the input color space, a conversion parameter while observing the shape of the output color space, and performing a color space compression processing based on the calculated conversion parameter. In such a method, there is a need to refer to many colors within the output color space so that a long period of time is required for the computation.

Thus, from the viewpoint of reduction of the processing time, a technique is proposed in which the conversion parameter is to be calculated on a separate mainframe computer. Specifically, the technique involves calculating the conversion parameter at a high speed, creating a table that allows direct conversion from the input color space into the output color space using the calculated conversion parameter, and performing the color conversion by utilizing this table. FIG. 16 is a flow chart representing the flow of processing when color matching is performed using such a method.

Referring to FIG. 16, when the respective profiles of the input color space and the output color space are obtained (step S1601), an output color corresponding to each color in the input color space is calculated using the conversion parameter calculated by the separate mainframe computer (step S1603). Then, using the result of calculation, a color conversion table for converting the input color space into the output color space is created (step S1605).

When a pixel value (image data) of the input image is obtained ("yes" in step S1607), using the created color conversion table, the image data within the input color space is directly converted into the image data within the output color space (step S1609). Then, the image data of the output image is obtained (step S1611).

In this manner, the color conversion processing is performed using the conversion parameter that is set by referring to the input color space and the output color space, it becomes possible to perform an appropriate conversion that takes into account the respective color space characteristics.

The conventional color matching method described above involved the following problems. In the conventional technique that utilizes a fixed value for a conversion parameter used in the color conversion processing, while the conversion processing is performed at a high speed, an appropriate and precise color conversion that takes into account the characteristics of the input color space and the characteristics of the output color space cannot be performed.

On the other hand, in the conventional technique in which the conversion parameter used in the color conversion processing is changed, the conversion parameter is calculated by taking into account the input color space and the output color space so that a precise color conversion is made possible. Yet, this technique caused the problem of complex processing and longer computation time being required.

In this manner, in the conventional color matching method, the improvement in the precision of color matching led to lower processing speed, while higher processing speed resulted in lower precision of matching. Thus, it was difficult to achieve both effects of improved precision and higher processing speed.

SUMMARY OF THE INVENTION

The object of the present invention is to provide a color matching method, a color matching device, and a computer readable record medium that stores a color matching program, which allow an appropriate color matching that takes into account characteristics of the input color space and the output color space to be performed at high speed.

In achieving the above object, according to one aspect of the present invention, a color matching method in which, when the color reproduction ranges of a first device and a second device differ, image data within the color reproduction range of the first device is converted using a conversion parameter into image data within the color reproduction range of the second device, includes the steps of obtaining data related to a specific color of the first device and data related to a specific color of the second device in a pre-scribed color space, and determining a conversion parameter by estimating the color reproduction range of the first device and the color reproduction range of the second device based on the respective data related to the specific color that are obtained.

According to this invention, data related to the specific color of the first device and data related to the specific color of the second device in a prescribed color space are obtained, and the color reproduction range of the first device and the color reproduction range of the second device are estimated and the conversion parameter is determined based on the respective data related to the specific color that are obtained.

Since the conversion parameter is determined based on the respective data related to the specific color of the first device and the second device, the precision of color matching improves when compared to the case in which the color matching is performed using a pre-fixed conversion parameter. In addition, higher computation processing speed for parameter determination can be achieved when compared to the case in which the conversion parameter is determined based on numerous color data.

Therefore, it becomes possible to provide a color matching method that allows appropriate color matching that takes into account the characteristics of the input color space and the output color space to be performed at a higher speed.

Preferably, the conversion parameters to be determined include at least one parameter of the parameters related to the conversions of lightness, chroma, and hue.

According to this invention, at least one parameter among the parameters related to the conversions of lightness, chroma, and hue is determined according to need so that it becomes possible to perform the corresponding conversion processing using the determined parameter.

Preferably, the prescribed color space is independent of a device.

According to this invention, the data related to the specific color of the first device and the second device are obtained as data represented in the color space that is independent of a device, such as L*a*b* space and XYZ space. Thus, the color reproduction range of the first device and the color reproduction range of the second device can be estimated appropriately and easily based on the obtained data, and it becomes possible to determine the conversion parameter based on the estimated color reproduction ranges.

Preferably, the data related to the specific color of the first device and the second device include data or a color temperature of a white point, and the determining step includes a first determining step of determining a parameter related to the conversion of chroma based on the respective data or color temperatures of the white point that are obtained.

According to this invention, data of the white point or a color temperature of the white point of the first device and the second device are obtained, and the general shapes of the color space of the first device and the color space of the second device are estimated. Then, a conversion parameter is determined based on the respective color space characteristics estimated.

The general shape of the color space can be estimated to a certain degree from the data or the color temperature of a white point. Therefore, the conversion parameter for performing an appropriate conversion processing can be easily set based on only a small amount of data.

Preferably, data related to a specific color of the first device and the second device include data of a blue point, and the determining step includes a first determining step of determining a parameter related to the conversion of chroma based on the respective data of the blue point that are obtained.

According to this invention, when either one of the first device and the second device is a monitor device such as a CRT, a parameter related to the conversion of chroma is determined based on the data of a blue point of the first device and the second device. The monitor device such as the CRT is characterized by the chroma characteristic of the blue color so that the general shape of the color space can be appropriately estimated from this data. Thus, the conversion parameter related to chroma is appropriately determined, and it becomes possible appropriately to perform the conversion processing of chroma based on the determined conversion parameter.

Preferably, the data related to a specific color of the first device include data of a blue point, a red point, and a green point, and the determining step includes a second determining step of determining a parameter related to hue based on the obtained respective data of the blue point, the red point, and the green point.

According to this invention, the parameter related to hue is determined based on data of the blue point, the red point, and the green point of the first device. The conversion parameter for hue is determined from data of the three points having high chroma in the first device so that it becomes possible to perform the conversion processing of hue easily and appropriately from an even smaller amount of data.

Preferably, the data related to a specific color of the first device include data of a blue point, a red point, and a green point, and the data related to a specific color of the second device include data of a blue point, a red point, a green point, a cyan point, a magenta point, and a yellow point, and the determining step includes a step of calculating a second blue point from data of the blue point and the cyan point of the second device obtained, a step of calculating a second red point from data of the red point and the magenta point of the second device obtained, a step of calculating a second green point from data of the green point and the yellow point of the second device obtained, and a second determining step of determining a parameter related to the conversion of hue based on the second blue point, the second red point, and the second green point calculated, and the data of the blue point, the red point, and the green point of the first device obtained.

According to this invention, the second blue point, the second red point, and the second green point are calculated from the obtained data related to the specific color of the second device. Then, the parameter related to the conversion of hue is determined based on these respective points that are calculated and the blue point, the red point, and the green point of the first device. Consequently, it becomes possible to perform the conversion processing of hue using the conversion parameter that more appropriately takes into account the color space characteristic of the second device.

In addition, according to another aspect of the present invention, a color matching device for converting image data within the color reproduction range of a first device into image data within the color reproduction range of a second device using a conversion parameter when the color reproduction ranges of the first device and the second device differ includes an obtaining portion for obtaining data related to a specific color of the first device and data related to a specific color of the second device in a prescribed color space, and a determining portion for determining the conversion parameter by estimating the color reproduction range of the first device and the color reproduction range of the second device based on the respective data related to the specific color that are obtained.

According to this invention, data related to a specific color of the first device and data related to a specific color of the second device in a prescribed color space are obtained, and the color reproduction range of the first device and the color reproduction range of the second device are estimated and a conversion parameter is determined based on the respective data related to the specific color that are obtained.

Since the conversion parameter is determined based on the respective data related to the specific color of the first device and the second device, the precision of color matching improves when compared to the case in which the color matching is performed using a pre-fixed conversion parameter. In addition, higher computation processing speed for parameter determination can be achieved when compared to the case in which the conversion parameter is determined based on numerous color data.

Therefore, it becomes possible to provide a color matching device that allows appropriate color matching that takes into account the characteristics of the input color space and the output color space to be performed at a higher speed.

According to a further aspect of the present invention, a computer readable record medium stores a color matching program for having a computer execute the color matching method for converting image data within the color reproduction range of a first device into image data within the color reproduction range of a second device when the color reproduction ranges of the first device and the second device differ. The color matching method includes the steps of obtaining data related to a specific color of the first device and data related to a specific color of the second device in a prescribed color space and determining the conversion parameter by estimating the color reproduction range of the first device and the color reproduction range of the second device based on the respective data related to the specific color that are obtained.

According to this invention, it becomes possible to provide a computer readable record medium that stores a color matching program that allows appropriate color matching that takes into account the characteristics of the input color space and the output color space to be performed at a higher speed.

According to a still further aspect of the present invention, a color matching program for having a computer execute color matching processing in a first color image reproduction device and a second color image reproduction device includes a first obtaining step of obtaining data of a white point and a black point in a first color space reproduced by the first color image reproduction device, a second obtaining step of obtaining data of a white point and a black point in a second color space reproduced by the second color image reproduction device, a step of estimating the general shapes of the first color space and the second color space based on the data obtained by the first and second obtaining steps, and a step of determining a conversion parameter for converting, based on the estimation, data within the first color space into data within the second color space.

According to this invention, the general shapes of the first color space and the second color space are estimated based on the data of the white point and the black point in the first color space and the second color space. Moreover, a conversion parameter for converting data within the first color space into data within the second color space is determined based on each general shape estimated.

Thus, the precision of color matching improves when compared to the case in which the color matching is performed using a pre-fixed conversion parameter. In addition, higher computation processing speed for parameter determination can be achieved when compared to the case in which the conversion parameter is determined based on numerous color data.

Therefore, it becomes possible to provide a color matching program for having a computer execute color matching processing that allows appropriate color matching that takes into account the characteristics of the input color space and the output color space to be performed at a higher speed.

Preferably, the conversion parameter is a parameter for correcting at least one of hue and lightness.

According to this invention, the conversion parameter for correcting at least one of hue and lightness is determined so that it becomes possible appropriately to perform the conversion processing using the determined parameter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a functional block diagram showing the arrangement of the computer of FIG. 1.

FIG. 10 is a flow chart representing the flow of processing of setting a color space compression parameter (step S403 of FIG. 4) according to a third embodiment.

FIGS. 11A and 11B are diagrams related to a description of calculation processing of a hue correction parameter in the third embodiment.

FIG. 13 is a diagram related to a description of calculation processing of a hue correction parameter in the fourth embodiment.

DESCRIPTION OF THE PREFERRED EMBODIMENTS

Now, the embodiments of the present invention will be described based on the drawings. The color matching processes in the embodiments shown here are all implemented by software that is executed on a computer.

First Embodiment

Figure 1:
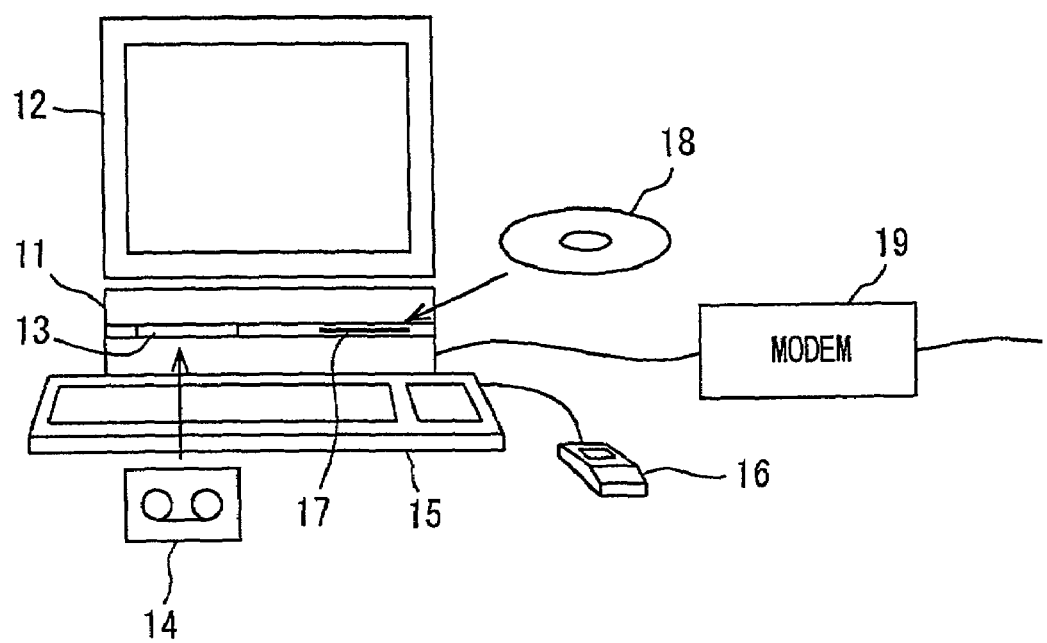
FIG. 1 is a diagram showing the outer appearance of a computer which is an example of a color matching device according to the present invention.

FIG. 1 is a diagram showing the outer appearance of a computer which is an example of a color matching device according to the present invention. A typical computer includes a main unit 11, a magnetic tape unit 13, a CD-ROM (Compact Disc-Read Only Memory) device 17, a display device (monitor) 12 such as a CRT, a key board 15, a mouse 16, and a modem 19. A magnetic tape 14 is mounted on magnetic tape unit 13, and a CD-ROM 18 is mounted on CD-ROM device 17.

FIG. 2 is a functional block diagram showing the arrangement of the computer. As shown in FIG. 2 and as is well known, main unit 11 of the computer includes a CPU (Central Processing Unit) 20, an ROM (Read Only Memory) 21, an RAM (Random Access Memory) 22, and a hard disk drive 23, which are interconnected by buses.

A program for performing color matching processing to be described below may be one that is installed in hard disk drive 23 in advance, or may be one that is recorded on a removable record medium such as CD-ROM 18 and magnetic tape 14.

When the program is one recorded on a removable record medium, the recorded program is read from the record medium by magnetic tape unit 13, CD-ROM device 17, and the like and is stored in hard disk drive 23. Thereafter, like the case where the program is installed in hard disk drive 23 in advance, the program is loaded to RAM 22 from hard disk drive 23 and CPU 20 performs the execution control of the program.

Moreover, the possible record media for recording the program may include tape media such as a magnetic tape or a cassette tape, disk media such as a magnetic disk (flexible disk, hard disk drive, and the like) and an optical disk (CD-ROM/MO/MD/DVD and so on), card media such as an IC card (including memory card) and an optical card, or media for carrying the program in a fixed manner such as a semiconductor memory and the like including a mask ROM, an EPROM, an EEPROM, a flash ROM, and so on.

Furthermore, the record medium may be a medium for carrying the program in a mobile manner, as the program may be downloaded from a network via a communication modem 19. When the program is to be downloaded from the network, a downloading program may be stored in advance in main unit 11 of the computer, or may be installed in advance from another record medium into main unit 11.

In addition, the content to be stored in the record medium is not limited to a program and may be data.

Figure 3:
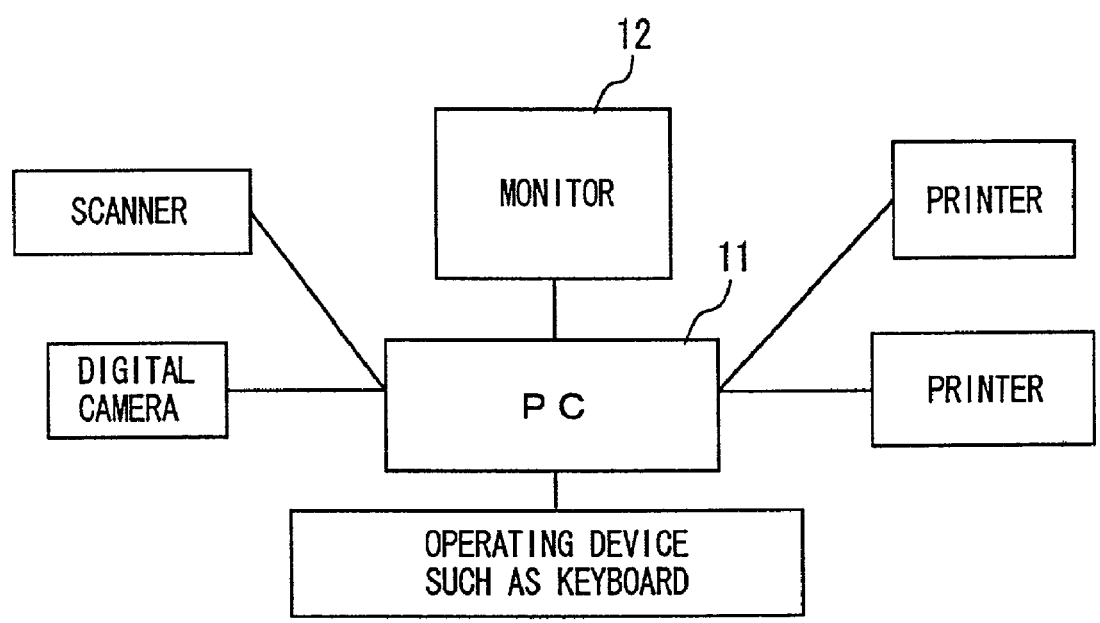
FIG. 3 is a diagram showing the connection arrangement when the color matching device performs color matching processing.

When the color matching device shown in FIG. 1 performs the color matching processing, the connection arrangement as shown in FIG. 3 is adopted. Specifically, an input device and an output device that are the targets of color matching are directly connected to main unit 11. Instead of directly connecting the input device and the output device to main unit 11, the necessary data may be read from an external record medium such as a CD-ROM or a network.

Now, a processing procedure of the color matching device according to the first embodiment of the present invention will be described using FIGS. 4 to 7.

Figure 4:
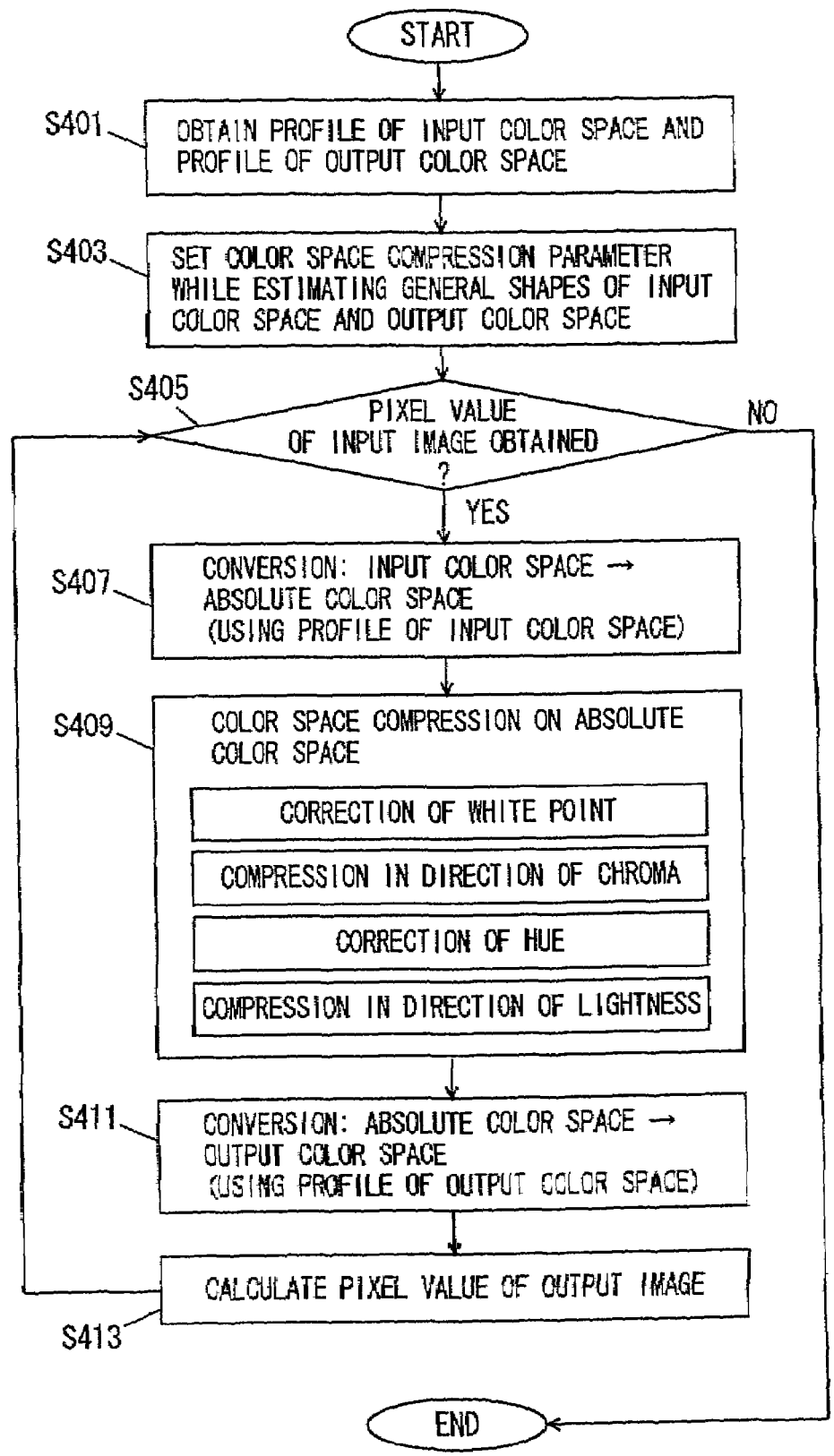
FIG. 4 is a flow chart representing the flow of the overall processing of the color matching device according to a first embodiment.
Figure 14:
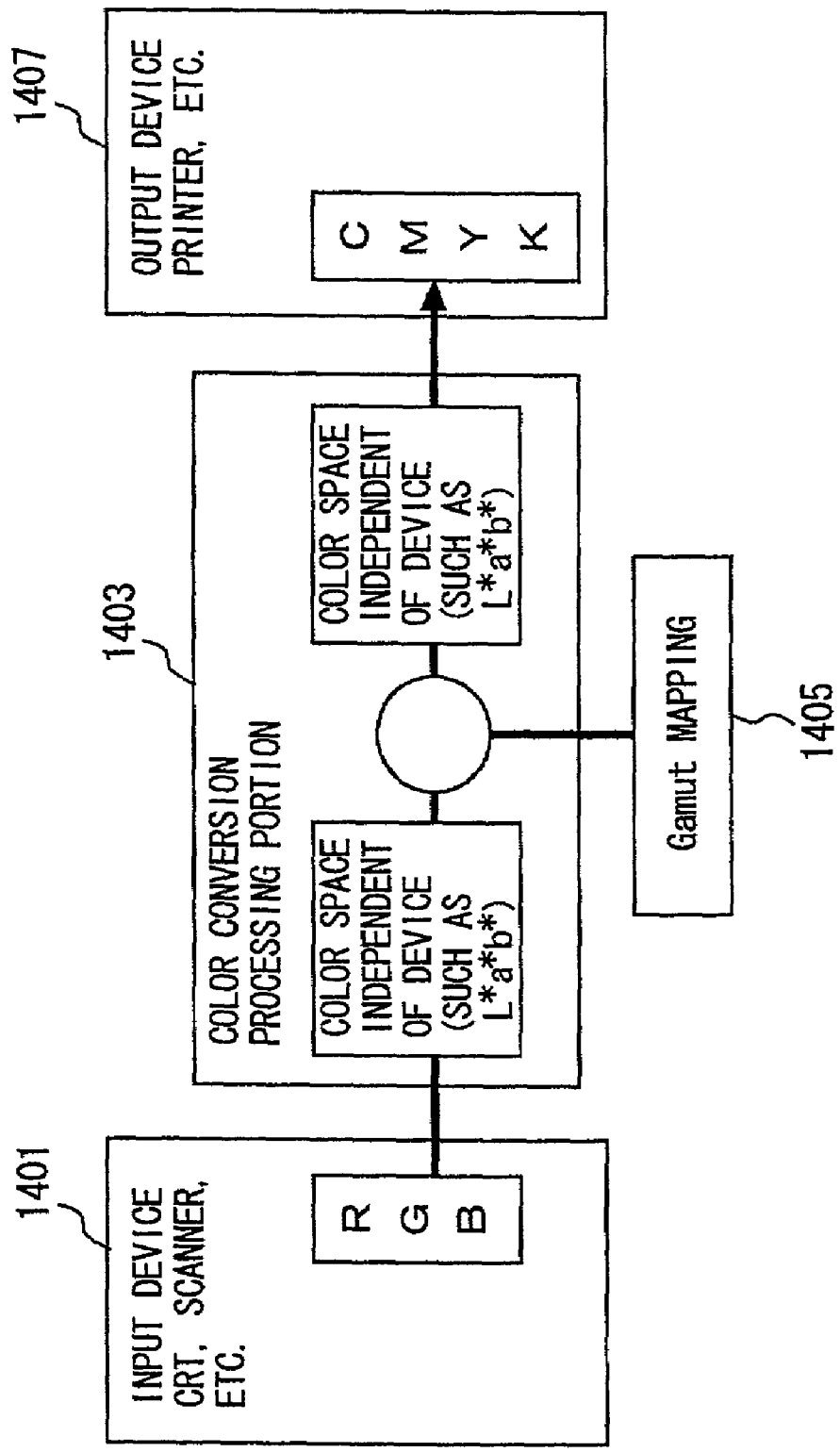
FIG. 14 is a diagram representing the flow of image data for the description of a method of color matching between an input device and an output device.
Figure 15:
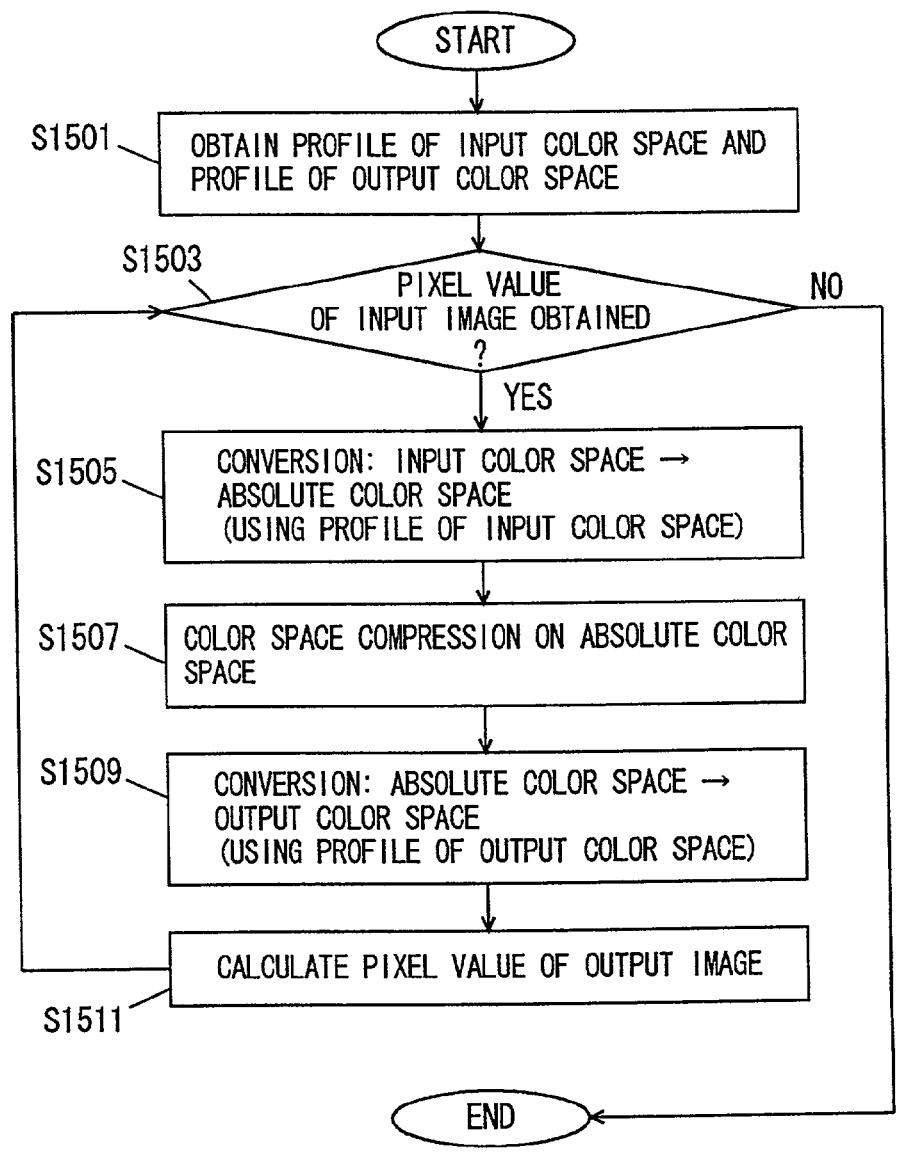
FIG. 15 is a flow chart representing the flow of a conventional color conversion processing in color conversion processing portion 1403 shown in FIG. 14.
Figure 16:
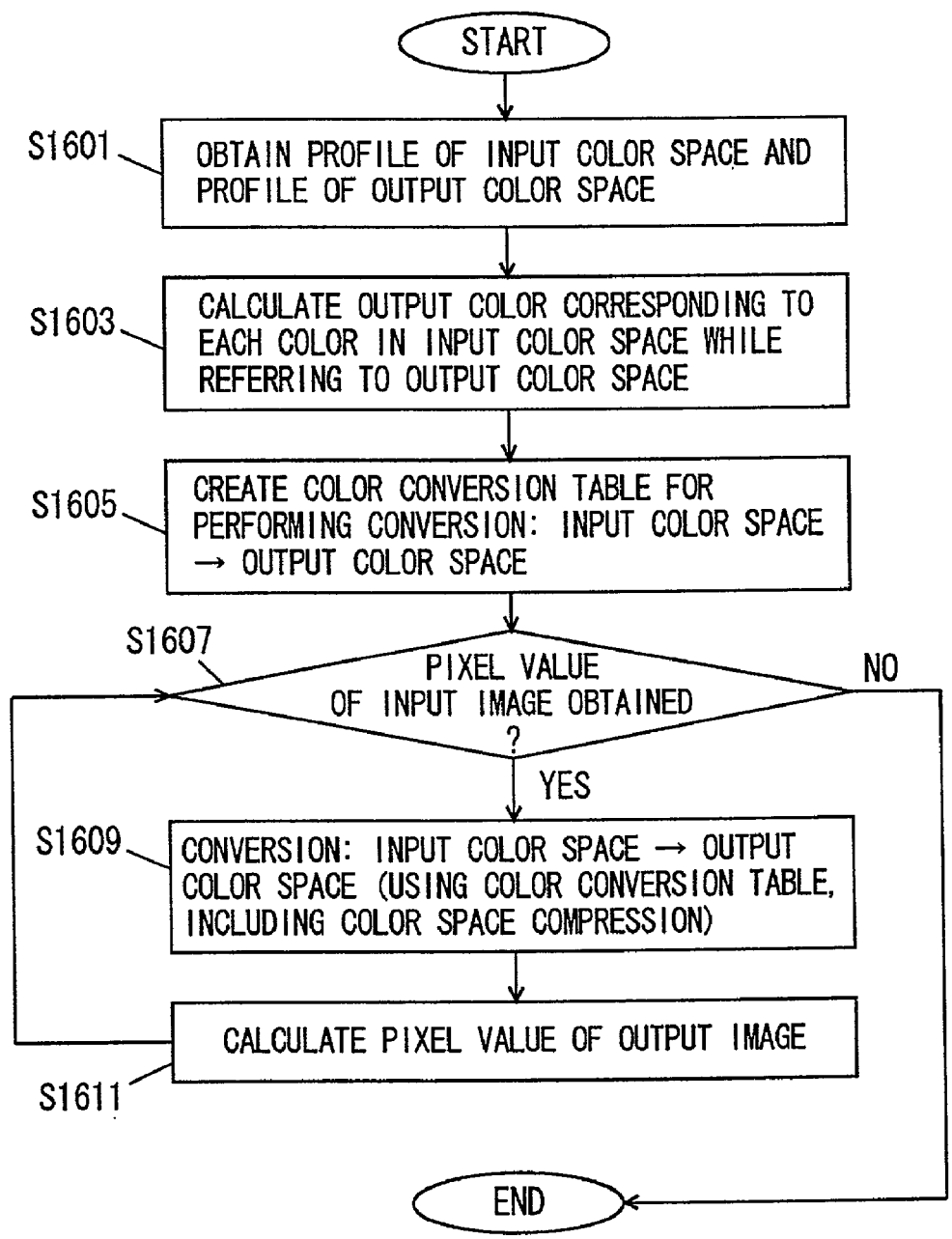
FIG. 16 is a flow chart representing the flow of processing when color matching is performed using a calculated conversion parameter.

FIG. 4 is a flow chart representing the flow of the overall processing of the color matching device according to the first embodiment. The processing performed here is the processing performed in color conversion processing portion 1403 shown in FIG. 14.

Referring to FIG. 4, first, in step S401, a profile of the input color space and a profile of the output color space are obtained, and from the profiles, the specific color data of the respective color spaces are obtained. In other words, data of a white point and a black point of the input color space and data of a white point and a black point of the output color space are obtained.

Then, in step S403, a color space compression parameter (conversion parameter) is set based on each white point data obtained. First, the general shape of the input color space is estimated based on the data of the white point of the input color space, and the general shape of the output color space is estimated based on the white point data of the output color space. Then, from the general shape of each color space estimated, a color space compression parameter is derived for appropriately converting data within the input color space into data within output color space. The term "color space compression" is used (hereinafter) to include, besides compression processing, each type of processing for converting data, such as expansion, rotation, transfer, and the like. The details thereof will be described later on.

When the color space compression parameter is set, in step S405, a pixel value (image data) of an input image to be the target of data conversion is obtained. Then in step S407, the obtained input image data is converted into image data represented in an absolute color space. For instance, when the input device is a CRT, the input image data obtained is data represented in the RGB space. This data represented in the RGB space is converted into data represented in a color space independent of the device (L*a*b* space, for instance) by a masking technique and the like.

Thereafter, in step S409, the color space compression processing on the absolute color space is performed. In other words, here, the color space compression parameter set in step S403 is used to perform the color matching (color conversion) of the input image data as the target of conversion. Specifically, four conversion processes are performed including correction of a white point, compression (including expansion; the same applies below) in the direction of chroma, correction of hue, and compression in the direction of lightness.

Figure 5:
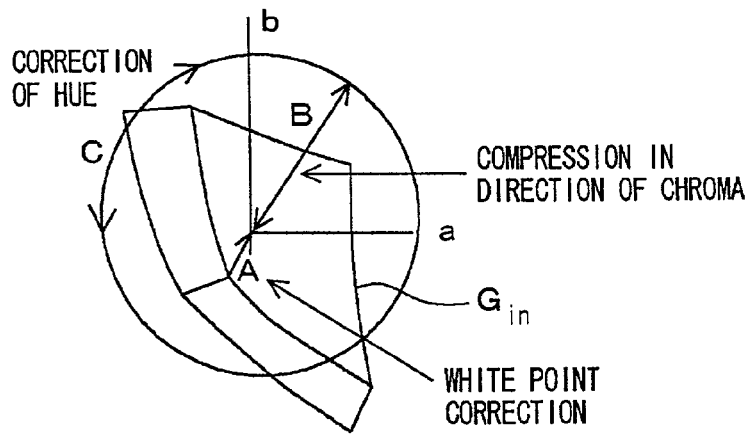
FIG. 5 is a diagram related to a description of a general outline of four conversion processes including correction of a white point, compression in the direction of chroma, correction of hue, and compression in the direction of lightness.

The general outline of these four conversion processes will be briefly described using FIG. 5. FIG. 5 shows an arbitrary cross section ab in the L*a*b* space that is a color space independent of a device. A polygon Gin represents a cross section of a plane ab of the input color space.

First, the correction processing of a white point will be described. The correction processing of the white point is the processing in which the input color space is moved such that a gray axis of an input color space approaches a gray axis of an output color space. In addition, the gray axis of the input color space is a line segment connecting a white point and a black point within the input color space, and the gray axis of the output color space is the line segment connecting a white point and a black point within the output color space. Here, due to the correction of the white point, the entire input color space Gin moves toward the direction of an arrow A. A start point of arrow A corresponds to a point on the gray axis of the input color space.

Next, the compression processing in the direction of chroma will be described. The compression processing in the direction of chroma is the processing in which the input color space is compressed or expanded in the direction of the chroma such that the chroma of the input color space is matched as much as possible to the chroma of the output color space. As shown by an arrow B, input color space Gin is compressed/expanded by changing the distance from the center (chroma).

Next, the correction of hue will be described. The correction of hue is correcting the deviated hue for correction of the white point described above. Specifically, as shown by an arrow C, input color space Gin is subjected to rotation manipulation and the like to correct the hue to an appropriate hue.

Finally, the compression processing in the direction of lightness will be described. The compression processing in the direction of lightness is the processing in which the input color space is compressed or expanded in the direction of lightness such that a white point and a black point in the input color space approach a white point and a black point of the output color space, respectively. Here, the compression or the expansion is effected in the direction perpendicular to the sheet (a direction perpendicular to plane ab).

The following shows in detail the procedure in which such four processes are performed, and input data of the L*a*b* space (Lin, ain, bin) is converted into output data of the L*a*b* space (Lout, aout, bout).

First of all, the input data (Lin, ain, bin) is subjected to the correction of the white point using a white point correction parameter, and white point correction data (Ltmp, atmp, btmp) is obtained. Then, in order to perform the compression processing in the direction of chroma and the correction of hue, a chroma Ctmp and a hue Htmp are calculated from the white point correction data (Ltmp, atmp, btmp) represented in an L-value, an a-value, and a b-value.

When chroma Ctmp is derived, chroma Ctmp is multiplied by a chroma compression parameter to perform the chroma compression and chroma compression data C'tmp is obtained. When hue Htmp is derived, a hue rotation parameter is included in consideration at the same time to perform the hue correction, and hue correction data T'tmp is obtained.

When chroma compression data C'tmp and hue correction data T'tmp are obtained, this time, a-value and b-value (Ltmp, aout, bout) corresponding to the respective data (Ltmp, C'tmp, T'tmp) are calculated.

Finally, a lightness Ltmp is multiplied by a lightness compression parameter to perform the lightness compression, and output data (Lout, aout, bout) is obtained.

In this manner, when the color space compression processing on the absolute color space is performed and output data represented in the L*a*b* space is obtained, in step S411, the output data is converted into data represented in a color space dependent on the output device. When the output device is a printer, CMY data is required as the final output data. Thus, the masking technique or the like is employed, and the output data represented in the L*a*b* space is converted into output data represented in the CMY space. Then, in step S413, from the output data after conversion, finally a pixel value suitable for the format of the output image is calculated.

Such processing from step S407 to step S413 is repeated until an input pixel value is no longer obtained (step S405).

The above description is the general flow of the overall color matching processing according to the first embodiment.

Figure 6:
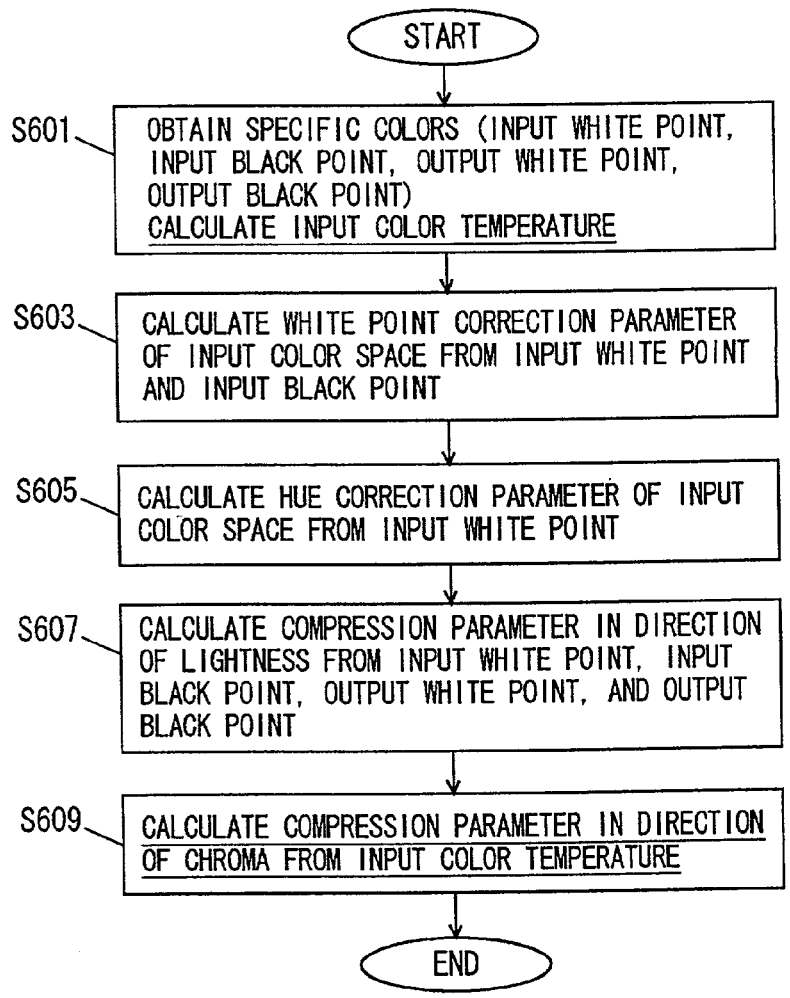
FIG. 6 is a flow chart representing the flow of processing of setting a color space compression parameter (step S403 of FIG. 4).

Now, using FIG. 6, the processing of setting a color space compression parameter (step S403 of FIG. 4) will be described in detail. The term "color space compression parameter" collectively refers to a white point correction parameter, a hue correction parameter, a lightness compression parameter, and a chroma compression parameter. Referring to FIG. 6, first, specific color data is obtained in step S601. In other words, the L*a*b* data of a white point and a black point of the input color space and the L*a*b* data of a white point and a black point of the output color space are obtained.

The L*a*b* data of the white point and the black point of the input color space is derived by performing color conversion on a value corresponding to the color white (R, G, B)=(255, 255, 255) and a value corresponding to the color black (R, G, B)=(0, 0, 0) from a profile of the input color space. Similarly, the L*a*b* data of the white point and the black point of the output color space is derived by performing color conversion on a value corresponding to the color white (C, M, Y)=(0, 0, 0) and a value corresponding to the color black (C, M, Y)=(255, 255, 255) from a profile of the output color space. When a value obtained from the profile of each color space is data represented in a color space other than the L*a*b* space, such as data represented in the XYZ (Yxy) space, it is converted as required into L*a*b* data using a transformation expression or the like defined by CIE (International Commission on Illumination).

For instance, data represented in XYZ is converted into L*a*b* data using the following expressions:

$$\begin{cases} L^* = 116\left(\frac{Y}{Y_n}\right)^{\frac{1}{3}} - 16 \\ a^* = 500\left[\left(\frac{X}{X_n}\right)^{\frac{1}{3}} - \left(\frac{Y}{Y_n}\right)^{\frac{1}{3}}\right] \\ b^* = 200\left[\left(\frac{Y}{Y_n}\right)^{\frac{1}{3}} - \left(\frac{Z}{Z_n}\right)^{\frac{1}{3}}\right] \end{cases}$$

where, Xn, Yn, Zn are tristimulus values of a perfectly diffuse reflector by a standard light, and Yn=100.

When the L*a*b* data of the white point and the black point in the input color space and the output color space are respectively obtained, a color temperature of the input color space (input color temperature) and a color temperature of the output color space (output color temperature) are also obtained. In this case, however, it is assumed that the output device is a printer and that the color temperature of the output color space is known, so that the color temperature of the input color space alone is derived.

The input color temperature is obtained from a tag and the like of a profile of the input color space. In addition, if data of the color temperature is not attached to the tag and the like, the color temperature is obtained either through calculation or by referring to a data table provided in advance.

When the color temperature is derived through calculation, x-data of a white point (Yxy colorimetric system) is calculated, and using this x-data, a color temperature Tc is derived from the relational expressions of x-data and a correlated color temperature Tc.

$$x = -4.6070\frac{10^9}{T_c^3} + 2.9678\frac{10^6}{T_c^2} + 0.09911\frac{10^3}{T_c} + 0.244063$$

(4000 K ≤ $T_c$ < 7000 K)

-continued $$x = -2.0064\frac{10^9}{T_c^3} + 1.9018\frac{10^6}{T_c^2} + 0.24748\frac{10^3}{T_c} + 0.237040$$

(7000 K ≤ $T_c$ < 25000 K)

Moreover, other techniques of obtaining the color temperature may include the user directly inputting the color temperature manually.

When data and the color temperature of the specific color of the input color space and the output color space respectively are obtained, a parameter for the white point correction is calculated in step S603. As described earlier, the correction processing of the white point is the processing in which the entire input color space is moved while lightness (L-value) is kept constant such that the gray axis of the input color space approaches the gray axis of the output color space.

The white point correction parameter calculated here is an amount of movement in plane ab of the white point and the black point. The amount of movement of a color having lightness between the white point and the black point is calculated by interpolation according to each L-value when the correction processing of the white point is actually performed.

Further, since it is assumed that the output device is a printer in this case, the gray axis in the output color space is assumed to match the lightness axis (L-axis).

The specific techniques of setting the white point correction parameter differ according to the type of white point correction processing that is actually performed. The techniques of setting the parameter corresponding to representative white point correction processing will be described below.

A first technique corresponds to the white point correction processing in which only the white point of the input color space is matched with the white point of the output color space. In other words, instead of matching the entire gray axis of the input color space to the gray axis of the output color space (the lightness axis in this case), the entire input color space is translated such that only the white points are matched. The color black is only affected to a relatively small degree by color difference so that higher speed of processing can be achieved by applying the amount of movement to that of the white point.

In this case, the white point correction parameter is derived from the ab-value (a, b) of the white point in the input color space as an amount of movement (−a, −b) of the white point and an amount of movement (−a, −b) of the black point.

A second technique corresponds to the white point correction processing in which the white point and the black point of the input color space are respectively matched with the white point and the black point of the output color space. In other words, in this correction processing, the entire input color space is moved such that the entire gray axis of the input color space matches the gray axis of the output color space. The purpose is to effect the gray axis correction with greater precision.

In this case, the white point correction parameter is derived from an ab-value of the white point (aw, bw) and an ab-value (−aB, −bB) of the black point of the input color space as an amount of movement (−aw, −bw) of the white point and an amount of movement (−aB, −bB) of the black point.

A third technique corresponds to the white point correction processing in which the white point of the input color space is matched with the white point of the output color space without moving the black point. In other words, the entire input color space is moved such that only the white point is matched with the white point in the output color space. This is used because, at times, it is desirable to output the color of black that is close to the black of the input device.

In this case, the white point correction parameter is derived from the ab-value (a, b) of the white point in the input color space as an amount of movement (−a, −b) of the white point and an amount of movement (0, 0) of the black point.

In addition, apart from the above-described white point correction parameter, a parameter $X1(0<X1\leq1)$ may be provided to control the degree of the white point correction. In other words, the above-described amount of movement (parameter) is multiplied by this parameter X1 to control the degree of the white point correction according to need.

When the white point correction parameter is set, then, a hue correction parameter of the input color space is calculated in step S605. Thus, the hue of the white point in the input color space is derived, and according to this hue of the white point, an amount of hue correction (rotation angle) is uniformly calculated as the hue correction parameter.

Moreover, the hue correction parameter may be set taking into account not only the hue of the white point but also the chroma. First, the hue and the chroma of the white point in the input color space are derived. Then, from these, an amount of variation in the hue in the specific color after the white point correction is performed is calculated. The calculated amount of variation may be used as the hue correction parameter.

After the hue correction parameter is set, a compression parameter in the direction of lightness of the input color space is calculated in step S607. This parameter is used when performing the compression/expansion processing to match the lightness of the input color space to that of the output color space.

The calculation procedure is as follows. First, the lightness differences of the white point and the black point are derived respectively in the input color space and the output color space. Then, the lightness difference in the output color space is divided by the lightness difference in the input color space, and this value becomes a compression ratio of the input color space. Moreover, the difference between the lightness of the black point of the output color space and the lightness of the black point of the input color space is derived, and this value becomes an intercept. Thus, during lightness correction processing, this value is added to the input color space multiplied by the compression ratio. In this manner, the compression ratio and the intercept are derived as the compression parameters.

In addition, here also, a parameter X2 (0<X) may be provided, and the degree of compression in the direction of lightness can be controlled by multiplying an amount of compression by this parameter X2.

Finally, a compression parameter of the direction of chroma of the input color space is calculated in step S609. This parameter is used when performing the compression/expansion processing to match the chroma of the input color space to that of the output color space.

A compression ratio of the direction of chroma is determined according to the color temperature of the white point in the input color space obtained in step S601. When the input color space is the CRT, there is a strong correlation between the color temperature and the general shape of the color space. Thus, the relation between the color temperature and the chroma compression ratio may be predefined and the compression ratio may be derived by a mathematical expression or a conditional expression, or a table may be set and be referred to in order to derive the compression ratio.

Figure 7A:
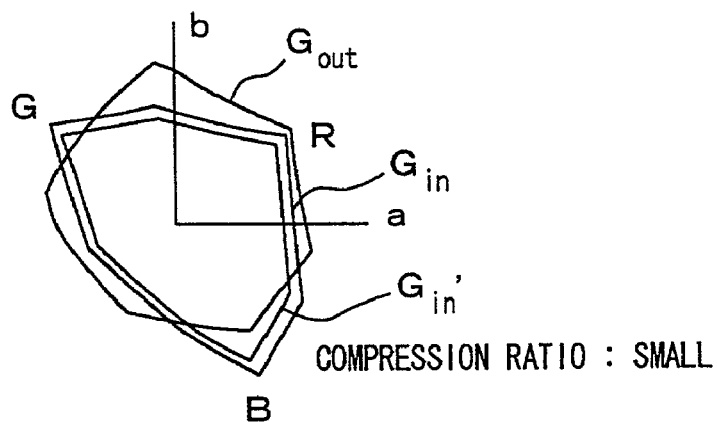
FIGS. 7A and 7B are diagrams related to a description of the relation between a color temperature and a chroma compression ratio.
Figure 7B:
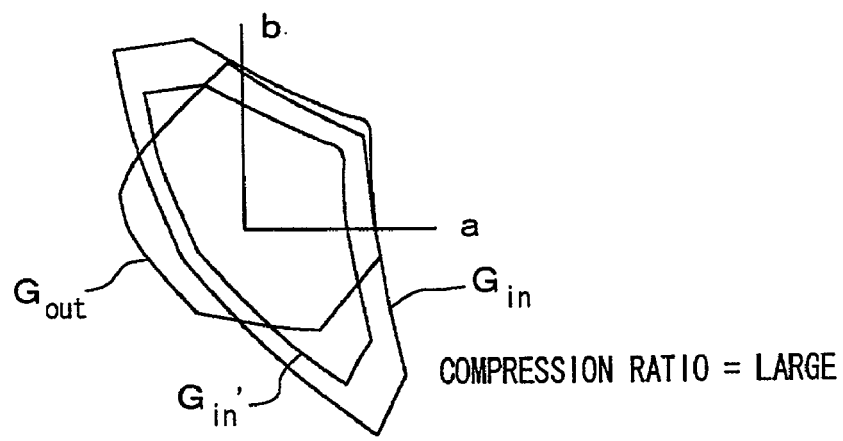

FIGS. 7A and 7B are diagrams related to the description of the relation between a color temperature and a chroma compression ratio. FIG. 7A shows the case where the color temperature of the input color space is 5000 K, while FIG. 7B shows the case where the color temperature of the input color space is 9300 K. Moreover, a polygon Gout represents a cross section of the output color space in a plane ab, while polygons Gin and Gin' respectively represent the cross sections of the input color space before and after compression in plane ab.

As shown in FIG. 7A, when the color temperature of the input color space is low, the range (color reproducible range) of the input color space is narrow. The ratio of chroma of blue, red and green in the input color space often takes a value close to 1:1, although blue has the highest chroma. Thus, the compression ratio in the direction of chroma is set to a small value.

On the other hand, as shown in FIG. 7B, when the color temperature of the input color space is high, the input color space is assumed to be a space that spreads to a large extent in the direction of blue. Therefore, the compression ratio in the direction of chroma is set to a relatively large value.

In this manner, there is a correlation between a color temperature of the white point and a chroma compression ratio in the input color space. Thus, based on this relationship, the compression ratio in the direction of chroma of the input color space that corresponds to the color temperature, i.e. the compressing parameter in the direction of chroma, is set appropriately.

A parameter for performing the color conversion processing (color space compression processing (step S403 of FIG. 4)) is set according to the above processing. Thus, unlike the case in which a fixed conversion parameter is used, an appropriate conversion parameter is set that takes into account the characteristics of the input color space and the output color space, respectively. The color conversion processing is performed using this parameter so that a more precise color conversion, or color matching, becomes possible.

Moreover, the conversion parameter is appropriately calculated only from the data of the specific colors (the white point and the black point) of the input color space and the output color space. Therefore, the processing becomes extremely simple when compared with a conventional method in which the conversion parameters are derived one by one from the numerous color data in the input color space.

Thus, it becomes possible to implement the color conversion processing of a higher speed that appropriately takes into account the characteristics of the input color space and the characteristics of the output color space.

In the flow chart shown in FIG. 6, the color temperature of the white point of the input color space (and the output color space) is obtained in step S601, and a compression parameter in the direction of chroma is determined in step S609 based on the general shape of the input color space (and the output color space) estimated from the obtained color temperature. When, however, the color temperature information cannot be easily obtained from a profile or the like of the input device or the output device, no attempt may be made to derive the color temperature from calculation formula and the like.

Therefore, instead of calculating the color temperature from the white point data, the general shapes of the input color space and the output color space may be directly estimated from the white point data to derive the compression parameter in the direction of chroma. In this case, the compression ratio in the direction of chroma of the input color space that corresponds to the white point data, i.e. the compressing parameter in the direction of chroma, is set appropriately.

As a result, even when the color temperature is difficult to obtain, the parameter can be set simply. What is more, the process of calculating the color temperature is skipped so that processing at an even higher speed becomes possible.

Second Embodiment

Now, the color matching device according to the second embodiment of the present invention will be described. The color matching device according to this embodiment has a similar outer appearance and a similar arrangement to the color matching device according to the first embodiment shown in FIGS. 1 and 2. Moreover, the flow of the overall processing of the color matching device according to this embodiment is generally similar to the flow of the flow chart shown in FIG. 4 in the first embodiment.

Figure 8:
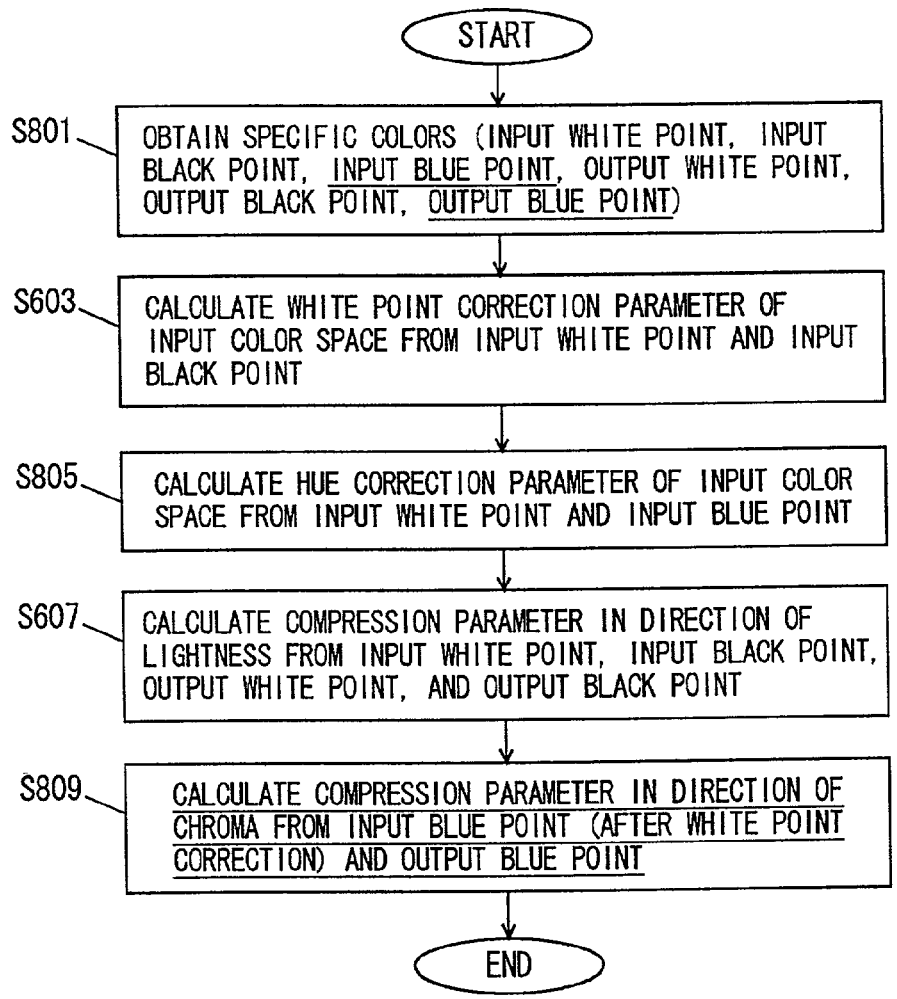
FIG. 8 is a flow chart representing the flow of processing of setting a color space compression parameter (step S403 of FIG. 4) according to a second embodiment.

The technique of setting a color space compression parameter in step 403 is different, however. FIG. 8 shows in a flow chart the flow of processing of setting a color space compression parameter (step S403 of FIG. 4) according to the second embodiment.

Here, the input device is assumed to be a monitor such as a CRT. In the monitor, the color blue has a high chroma so that the general shape of the input color space largely depends on the data of the blue point. Thus, unlike the first embodiment, the data for the color blue is additionally obtained as specific color data on top of the data of the color white and the data of the color black in the second embodiment.

Referring to FIG. 8, first, the specific color data is obtained in step S801. In other words, the L*a*b* data of a white point, a black point, and a blue point in the input color space and the L*a*b* data of a white point, a black point, and a blue point in the output color space are obtained.

The L*a*b* data of the white point, the black point, and the blue point of the input color space is derived by performing color conversion on a value corresponding to the color white (R, G, B)=(255, 255, 255), a value corresponding to the color black (R, G, B)=(0, 0, 0), and a value corresponding to the color blue (R, G, B)=(0, 0, 255) from a profile of the input color space. Similarly, the L*a*b* data of the white point, the black point, and the blue point of the output color space is derived by performing color conversion on a value corresponding to the color white (C, M, Y)=(0, 0, 0), a value corresponding to the color black (C, M, Y)=(255, 255, 255) and a value corresponding to the color blue (C, M, Y)=(255, 255, 0) from a profile of the output color space. When a value obtained from the profile of each color space is data represented in a color space other than the L*a*b* space, such as data represented in the XYZ (Yxy) space, it is converted as required into L*a*b* data using a transformation expression or the like defined by CIE.

Then, in step S603, a parameter of white point correction is calculated. The processing performed here is similar to the processing in the first embodiment (step S603 in FIG. 6).

Thus, like the processing in step S603 of FIG. 6, an amount of movement in plane ab of the white point and the black point is calculated as the white point correction parameter. The amount of movement of a color having lightness between the white point and the black point is calculated by interpolation according to each L-value when the correction processing of the white point is actually performed.

Moreover, also in this case, apart from the white point correction parameter, a parameter X1 (0<X1≦1) may be provided to control the degree of the white point correction.

Thereafter, a hue correction parameter of the input color space is calculated in step S805. In other words, the hue of the blue point in the input color space and the hue of the blue point in the output color space are respectively derived, and an amount of correction (angle) is uniformly determined such that the input blue point derived approaches the output blue point.

In addition, the hue correction parameter may be set taking into account not only the hue of the blue point but also the hue of the white point. Therefore, first, the hue of the blue point and the hue of the white point in the input color space are derived. Then, an amount of variation (angle) in the hue is calculated such that these hues approach the specific hues, such as ideal hues that are set in advance. The calculated amount of variation may be used as the hue correction parameter.

Moreover, like the processing (step S605 in FIG. 6) in the first embodiment, a parameter may be calculated from the hue and the like of the white point alone.

Thereafter, a compression parameter in the direction of lightness of the input color space is calculated in step S607. This process is similar to the process in step S607 of FIG. 6. Thus, in a similar manner, a compression ratio and an intercept are derived as a compression parameter from the white point and the black point respectively of the input color space and the output color space.

In addition, here also, a parameter X2 (0<X) may be provided, and the degree of compression in the direction of lightness can be controlled by multiplying an amount of compression by this parameter X2.

Finally, a compression parameter of the direction of chroma of the input color space is calculated in step S809. When the input/output device is a monitor such as a CRT, the extent of the overall input color space can be estimated by the chroma of blue. Thus, the general shapes of the input color space and the output color space are estimated from the chroma of the blue point in the input color space and the chroma of the blue point in the output color space, and based on the estimated general shapes of the input color space and the output color space, the compression parameter in the direction of chroma is derived.

Specifically, first, the chroma is derived of the color blue in the input color space after the white point correction is performed using the white point correction parameter obtained in step S803. Then, the difference is taken between the chroma of blue after the correction and the chroma of blue of the output color space. Thereafter, a compression ratio in the direction of chroma of the input color space is calculated such that the difference is reduced by a certain proportion. The calculated compression ratio becomes the compression parameter.

Figure 9:
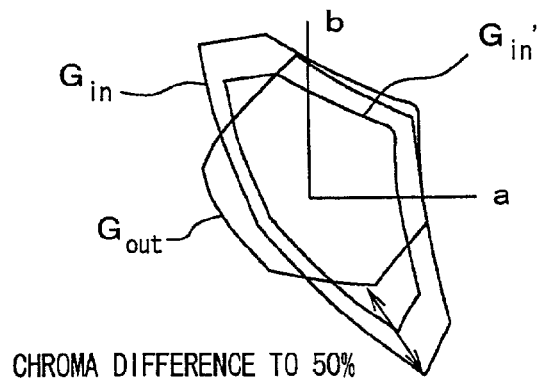
FIG. 9 is a diagram related to a description of a case in which chroma difference of the blue color between the input color space and the output color space is reduced by 50 percent.

FIG. 9 is a diagram related to the description of a case in which chroma difference of the blue color between the input color space and the output color space is reduced by 50 percent. A polygon Gin indicates a cross section ab of the input color space after the white point correction is performed, and a polygon Gin' indicates a cross section ab after the input color space is subjected to compression in the direction of the chroma. Further, a polygon Gout indicates a cross section ab of the output color space.

Referring to FIG. 9, one end (on the outside) of the double-headed arrow corresponds to the blue point in the input color space, and the other end (on the inside) corresponds to the blue point in the output color space. Moreover, the size of the double-headed arrow indicates the chroma difference of the color blue in the input color space and the output color space. Here, input color space G is compressed to G' such that the chroma difference becomes 50 percent.

In this manner, according to the second embodiment, the general shapes of the respective color spaces can be estimated from the chroma of the blue point of the input color space and the output color space. Thus, it becomes possible to perform appropriate color space compression according to the extent of the chroma of the input color space and the output color space by referring to only a small number of colors.

In particular, when at least one of the input device and the output device is a monitor such as a CRT, a more accurate color matching processing can be performed at a high speed by making a reference to data of the blue color.

Third Embodiment

Now, the color matching device according to the third embodiment of the present invention will be described. The color matching device according to the third embodiment also has a similar outer appearance and a similar arrangement to the color matching devices according to the first and second embodiments shown in FIGS. 1 and 2. In addition, the flow of the overall processing of the color matching device according to the third embodiment is substantially the same as the flow of the flow chart shown in FIG. 4 according to the first embodiment.

The technique of setting the color space compression parameter in step S403 is different, however. FIG. 10 shows a flow chart of the flow of processing of setting a color space compression parameter (step S403 of FIG. 4) according to the third embodiment.

Referring to FIG. 10, first, specific color data is obtained in step S1001. Unlike the first embodiment, here, L*a*b* data of a white point, a black point, a blue point, a red point, and a green point of the input color space and L*a*b* data of a white point and a black point of the output color space are obtained. The technique of obtaining each color data is the same as those described in the first and second embodiments (step S601 in FIG. 6) so that the description will not be repeated. In addition, the color temperature of the white point in the input color space and the output color space are obtained in a similar manner at this point.

Then, a parameter for the white point correction is calculated in step S603. The processing performed here is similar to the processing in the first embodiment (step S603 of FIG. 6). Thus, an amount of movement in plane ab of the white point and the black point is calculated as the white point correction parameter in a similar manner. The amount of movement of a color having lightness between the white point and the black point is calculated by interpolation according to each L-value when the correction processing of the white point is actually performed.

In this case, also, apart from the white point correction parameter, a parameter X1 (0<X1≦1) may be provided to control the degree of the white point correction.

Then, a compression parameter in the direction of lightness of the input color space is calculated in step S607. This processing is similar to the processing of step S607 in FIG. 6. Thus, in a similar manner, a compression ratio and an intercept are derived as a compression parameter from the white point and the black point respectively of the input color space and the output color space.

In addition, here also, a parameter X2 (0may be provided, and the degree of compression in the direction of lightness can be controlled by multiplying an amount of compression by this parameter X2.

Then, a hue correction parameter of the input color space is calculated in step S1005. In other words, first, hue of a blue point, a red point, and a green point in the input color space are derived. Then, hue of the blue point, the red point, and the green point after the white point correction using the white point correction parameter calculated in step S603 are calculated. Then, a hue correction parameter is calculated from the hue difference between the hue before the white point correction and the hue after the correction. The hue between each color of the blue point, the red point, and the green point is calculated by interpolation according to the hue (angle) when the hue correction processing is actually performed.

FIGS. 11A and 11B are diagrams related to the description of calculation processing of a hue correction parameter in the third embodiment. FIG. 11A indicates a cross section of an input color space Gin before the white point correction in a plane ab, while FIG. 11B indicates an input color space Gin' after the white point correction in plane ab.

As shown in FIG. 11B, when the input color space moves from Gin to Gin' due to the white point correction, deviation in hue is created for each point of the blue point, the red point, and the green point. Thus, as shown by the arrows, the hue of each of these points are rotated and corrected such that the hue approaches the original hue. Each rotation angle at this time is derived as a hue correction parameter.

When the hue correction parameter is calculated, finally, a compression parameter of the direction of chroma of the input color space is calculated in step S609. The processing performed here is similar to the processing in the first embodiment (step S609 of FIG. 6). Thus, in a similar manner, a compression ratio in the direction of chroma is determined according to the color temperature of the white point of the input color space obtained in step S1001. The color temperature may be derived by a mathematical expression or a conditional expression, or a table may be set and be referred to in order to derive the color temperature.

Moreover, for the step of calculating a chroma compression parameter, the processing according to the second embodiment may be performed in which the calculation is performed by chroma of the blue point (step S809 in FIG. 8). In this case, data of the blue point in the output color space is further obtained in step S1001, and the color temperatures of the input color space and the output color space are not obtained.

In this manner, according to the third embodiment, data of points that exist in a region of high chroma within the input color space, i.e., the blue point, the red point, and the green point, are obtained. Then, a hue correction parameter is calculated from the difference of hue of these points from before and after the white point correction. Thus, even when the white point correction is performed, the hue of a color having a high chroma can be appropriately corrected. As a result, the color matching becomes possible that allows an image of even better hue to be produced.

Fourth Embodiment

Finally, the color matching device according to the fourth embodiment of the present invention will be described. The color matching device according to the fourth embodiment also has a similar outer appearance and a similar arrangement to the color matching devices according to the first and second embodiments shown in FIGS. 1 and 2. In addition, the flow of the overall processing of the color matching device according to the fourth embodiment is substantially the same as the flow of the flow chart shown in FIG. 4 according to the first embodiment.

Figure 12:
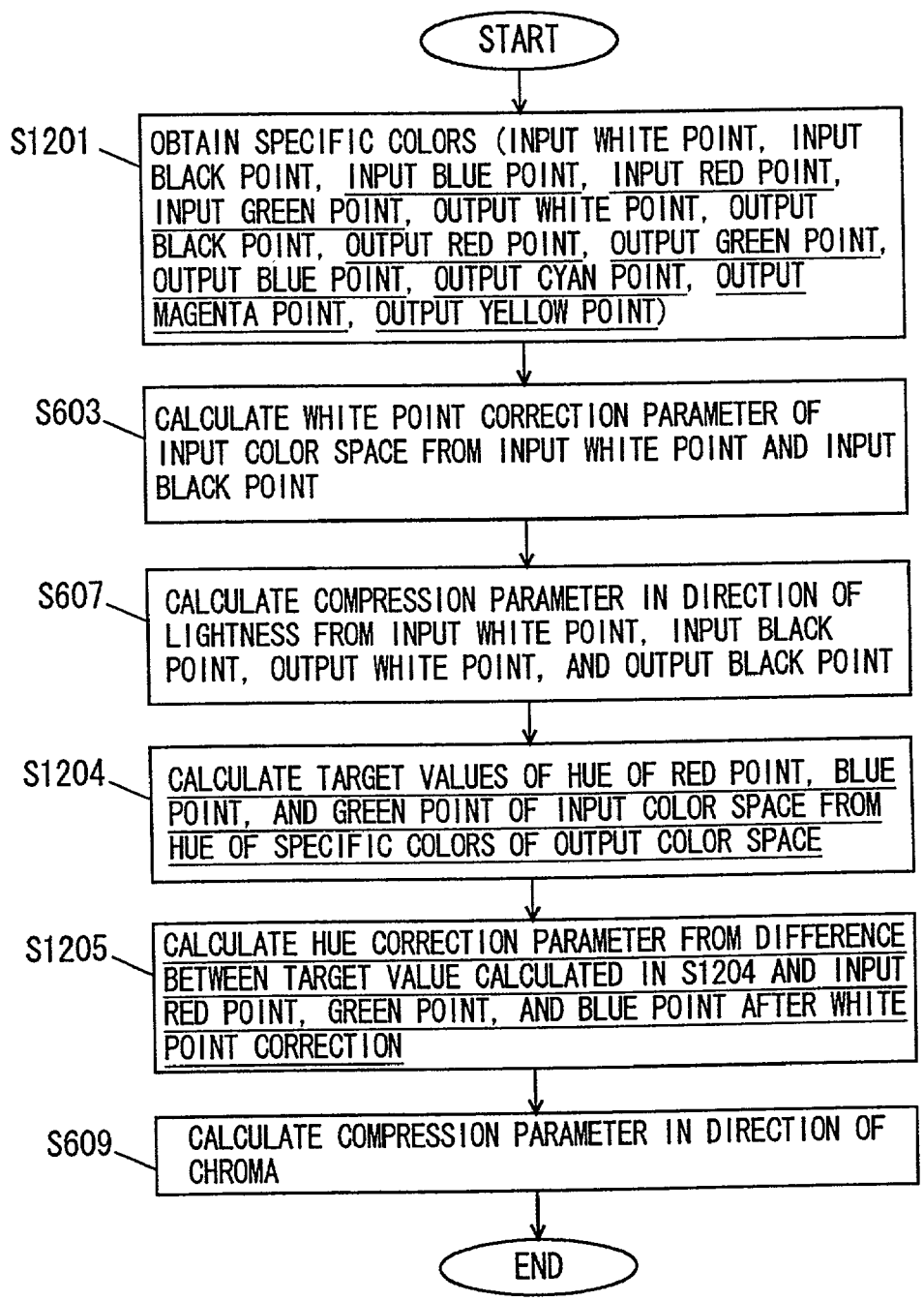
FIG. 12 is a flow chart representing the flow of processing of setting a color space compression parameter (step S403 of FIG. 4) according to a fourth embodiment.

The technique of setting the color space compression parameter in step S403 is different, however. FIG. 12 shows in a flow chart the processing of setting a color space compression parameter (step S403 of FIG. 4) according to the fourth embodiment.

Referring to FIG. 12, first, specific color data is obtained in step S1201. In other words, L*a*b* data of a white point, a black point, a blue point, a red point, and a green point of the input color space and L*a*b* data of a white point, a black point, a blue point, a red point, a green point, a cyan point, a magenta point, and a yellow point of the output color space are obtained. The technique of obtaining each color data is the same as those described in the first and second embodiments (step S601 in FIG. 6) so that the description will not be repeated. In addition, the color temperature of the white point in the input color space and the output color space are obtained in a similar manner at this point.

Then, a parameter for the white point correction is calculated in step S603. The processing performed here is similar to the processing in the first embodiment (step S603 of FIG. 6). Thus, an amount of movement in plane ab of the white point and the black point is calculated as the white point correction parameter in a similar manner. The amount of movement of a color having lightness between the white point and the black point is calculated by interpolation according to each L-value when the correction processing of the white point is actually performed.

In this case, also, apart from the white point correction parameter, a parameter X1 (0<X1≦1) may be provided to control the degree of the white point correction.

Then, a compression parameter in the direction of lightness of the input color space is calculated in step S607. This processing is similar to the processing of step S607 in FIG. 6. Thus, in a similar manner, a compression ratio and an intercept are derived as a compression parameter from the white point and the black point respectively of the input color space and the output color space.

In addition, here also, a parameter X2 (0<X) may be provided, and the degree of compression in the direction of lightness can be controlled by multiplying an amount of compression by this parameter X2.

Then, target values of hue of the blue point, the red point, and the green point of the input color space are calculated from the hue of the specified colors of the output color space in step S1204. In other words, first, the respective hue is derived from data of the blue point and the cyan point of the output color space obtained in step S1201. Then, B' is calculated by dividing between the derived hue in a prescribed ratio. Moreover, between the red point and the magenta point of the output color space, R' is calculated by dividing between the two hue at a prescribed ratio, and between the green point and the yellow point of the output color space, G' is calculated in a similar manner. The R', G', and B' calculated as points dividing between hues of specific colors at prescribed ratios become the target values of hues of the blue point, the red point, and the green point of the input color space, respectively.

Moreover, the prescribed ratios for setting these target values may be determined empirically for each color, or may be manually input according to need.

Then, a hue correction parameter of the input color space is calculated in step S1205. In other words, first, hue of the blue point, the red point, and the green point after the white point correction using the white point correction parameter calculated in step S603 are calculated. Then, a hue correction (rotation) parameter is calculated such that each of these points after the white point correction approach the target values B', R', and G' derived in step S1204. The hue between each color of the blue point, the red point, and the green point is calculated by interpolation according to the hue (angle) when the actual hue correction processing is performed.

FIG. 13 is a diagram related to the description of calculation processing of a hue correction parameter in the fourth embodiment. Referring to FIG. 13, a polygon Gout represents a cross section of the output color space in a plane ab, while a polygon Gin represents a cross section in plane ab of the input color space after hue correction.

As shown in this diagram, target values B', R', and G' are derived by dividing, at a prescribed ratio for each color, between hue B of the blue point and hue C of the cyan point, between hue R of the red point and hue M of the magenta point, and between hue G of the green point and hue Y of the yellow point of output color space Gout, respectively.

A hue correction parameter is calculated such that the respective hue of the blue point, the red point, and the green point of the input color space after the white point correction approach these target values B', R', and G'. Therefore, when the hue correction is performed by the calculated hue correction parameter, the blue point, the red point, and the green point of input color space Gin approach target values of B', R', and G', as shown in FIG. 13.

When the hue correction parameter is calculated, finally, a compression parameter of the direction of chroma of the input color space is calculated in step S609. The processing performed here is similar to the processing in the first embodiment (step S609 of FIG. 6). Thus, in a similar manner, a compression ratio in the direction of chroma is determined according to the color temperature of the white point of the input color space obtained in step S1201. The color temperature may be derived by a mathematical expression or a conditional expression, or a table may be set and be referred to in order to derive the color temperature.

Moreover, for the step of calculating a chroma compression parameter, the processing according to the second embodiment may be performed in which the calculation is performed by chroma of the blue point (step S809 in FIG. 8). In this case, the color temperatures of the input color space and the output color space are unnecessary in step S1201. Thus, the calculation can be performed by an even simpler processing.

In this manner, according to the fourth embodiment, a hue correction parameter is calculated for the blue point, the red point, and the green point of the input color space according to the characteristics of the output color space. Thus, it becomes possible to obtain an image of a more appropriate hue that takes into account the output state.

Moreover, in step S1204 of FIG. 12, a prescribed division ratio for setting a target value may be changed according to the type of the output device (an ink-jet printer, an LBP (laser beam printer), a sublimatic printer, etc.).

In addition, in step S1204 of FIG. 12, target values are set from six points of a white point, a black point, a blue point, a red point, a green point, a cyan point, a magenta point, and a yellow point of the output color space. The present invention, however, is not limited to this method, and for instance, hue derived by rotating each of the blue point, the red point, and the green point by a prescribed hue (angle) may be the target values B', R', and G'. In this manner, number of data of the specific color to be obtained in step S1201 can be reduced.

Moreover, although a CRT is given as an example of the input device, and a printer is given as an example of the output device in the present embodiments shown, they are not so limited. The present invention can be applied to any device where the matching of colors is performed between devices having different color reproduction ranges.

Further, the processing procedure of color matching is not limited to the procedure of the four processes in step S409 shown in FIG. 4, that is, the correction of the white point, the compression in the direction of chroma, the correction of hue, and the compression in the direction of lightness in this order. The processing of the white point correction needs to be performed prior to the processing of the compression in the direction of chroma and the correction of hue, but the compression in the direction of lightness can be performed in any order, theoretically. In addition, no problem is caused by switching the order of the chroma compression and the hue correction. Moreover, the present invention is applicable in a case where some of the processes are integrated, such as when performing the white point correction and the lightness compression processing simultaneously.

Similarly, the procedure of setting the color space compression parameter described herein is not limited to the flows shown in FIGS. 6, 8, 10, and 12, and alteration of order and integration of processing is also possible.

Furthermore, although the compression ratio in the direction of chroma of the color space is made uniform in the present embodiments described herein, the present invention is not so limited, and the compression ratio in the direction of chroma can be changed according to an R-value, a G-value, and a B-value of the input color space. Then, it becomes possible to perform a more precise color matching.

Although all the color matching processing is described herein as being implemented by software, some processing may be implemented by hardware, depending on the content of the processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color matching method in which, when color reproduction ranges of a first device and a second device differ, image data within a color reproduction range of said first device is converted using a conversion parameter into image data within a color reproduction range of said second device, comprising the steps of:
   obtaining data related to a first specific color of said first device and data related to a second specific color of said second device in a prescribed color space; and
   determining a compression parameter in a direction of chroma for converting data in an input color space into data in an output color space by estimating a general shape of the input color space and output color space based on said obtained data related to the first specific color of said first device and related to the second specific color of said second device.

2. A color matching device for converting image data within a color reproduction range of a first device into image data within a color reproduction range of a second device using a conversion parameter when the color reproduction ranges of said first device and said second device differ, comprising:
   an obtaining portion for obtaining data related to a first specific color of said first device and data related to a second specific color of said second device in a prescribed color space; and
   a determination portion for determining a compression parameter in a direction of chroma for converting data in an input color space into data in an output color space by estimating a general shape of the input color space and the output color space based on said obtained data related to the first specific color and related to the second specific color that are obtained.

3. A computer readable record medium storing a color matching program for having a computer execute a color matching method for converting image data within a color reproduction range of a first device into image data within a color reproduction range of a second device using a conversion parameter when the color reproduction ranges of said first device and said second device differ, wherein said color matching method includes the steps of:
   obtaining data related to a specific color of said first device and data related to a specific color of said second device in a prescribed color space, and
   determining a compression parameter in a direction of chroma for converting data in an input color space into data in an output color space by estimating a general shape of the input color space and the output color space based on said obtained data related to the first specific color and related to the second specific color.

4. The color matching method according to claim 1, wherein said first specific color and said second specific color include white points.

5. The color matching method according to claim 1, wherein data of said first specific color and data of said second specific color include color temperatures of white points.

6. The color matching method according to claim 4, wherein a white point correction parameter is determined based on said obtained data related to the first specific color and related to the second specific color.

7. The color matching method according to claim 4, wherein a hue correction parameter of the input color space is determined based on said obtained data related to the first specific color.

8. The color matching method according to claim 1, wherein said first specific color and said second specific color include a white point and a black point, respectively;
   said color matching method further comprising the step of calculating a compression parameter in a direction of lightness of the input color space based on said obtained data related to the first specific color and related to the second specific color.

9. The color matching method according to claim 1, wherein said first specific color and said second specific color include blue points, and
   said compression parameter in the direction of chroma is determined based on at least one of data related to a white point and data related to a blue point.

10. The color matching method according to claim 1, wherein said first specific color and said second specific color include a white point and a blue point, respectively, said color matching method further comprising the step of determining a white color correction parameter based on data related to a white point of said first device and data related to a white point of said second device, wherein said compression parameter in the direction of chroma is determined based on a difference between the chroma of a blue point in the input space subsequent to white point correction by said white point correction parameter and the chroma of a blue point of the output space.

11. The color matching method according to claim 1, wherein said first specific color includes a white point, a blue point, a red point, and a green point, and said second specific color includes a white point, said color matching method further comprising the step of determining a hue correction parameter based on data related to a blue point, a red point, and a green point of said first device, wherein said compression parameter in the direction of chroma is determined based on data related to a white point of said first device and said second device.

12. The color matching method according to claim 1, wherein said first specific color includes a white point, a blue point, a red point, and a green point, and said second specific color includes a white point, a blue point, a red point, a green point, a cyan point, a magenta point, and a yellow point, said color matching method further comprising the step of calculating a second blue point from a blue point and cyan point of said second device, calculating a second red point from a red point and magenta point of said second device, and calculating a second green point from a green point and yellow point of said second device, and determining a hue correction parameter based on data related to a blue point, red point, and green point of said first device and said calculated data related to a blue point, red point, and green point;

wherein said compression parameter in the direction of chroma is determined based on at least one of data related to a white point and data related to a blue point.

13. The color matching method according to claim 1, wherein said first specific color and said second specific color include blue points, and said compression parameter in the direction of chroma is determined based on data related to a white point and data related to a blue point.

14. The color matching method according to claim 1, wherein said first specific color includes a white point, a blue point, a red point, and a green point, and said second specific color includes a white point, a blue point, a red point, a green point, a cyan point, a magenta point, and a yellow point, said color matching method further comprising the step of calculating a second blue point from a blue point and cyan point of said second device, calculating a second red point from a red point and magenta point of said second device, and calculating a second green point from a green point and yellow point of said second device, and determining a hue correction parameter based on data related to a blue point, red point, and green point of said first device and said calculated data related to a blue point, red point, and green point;

wherein said compression parameter in the direction of chroma is determined based on data related to a white point and data related to a blue point.

* * * * *